No. 637,777. Patented Nov. 28, 1899.
S. G. GOSS.
PRINTING PRESS.
(Application filed Nov. 29, 1897.)
(No Model.) 2 Sheets—Sheet 1.
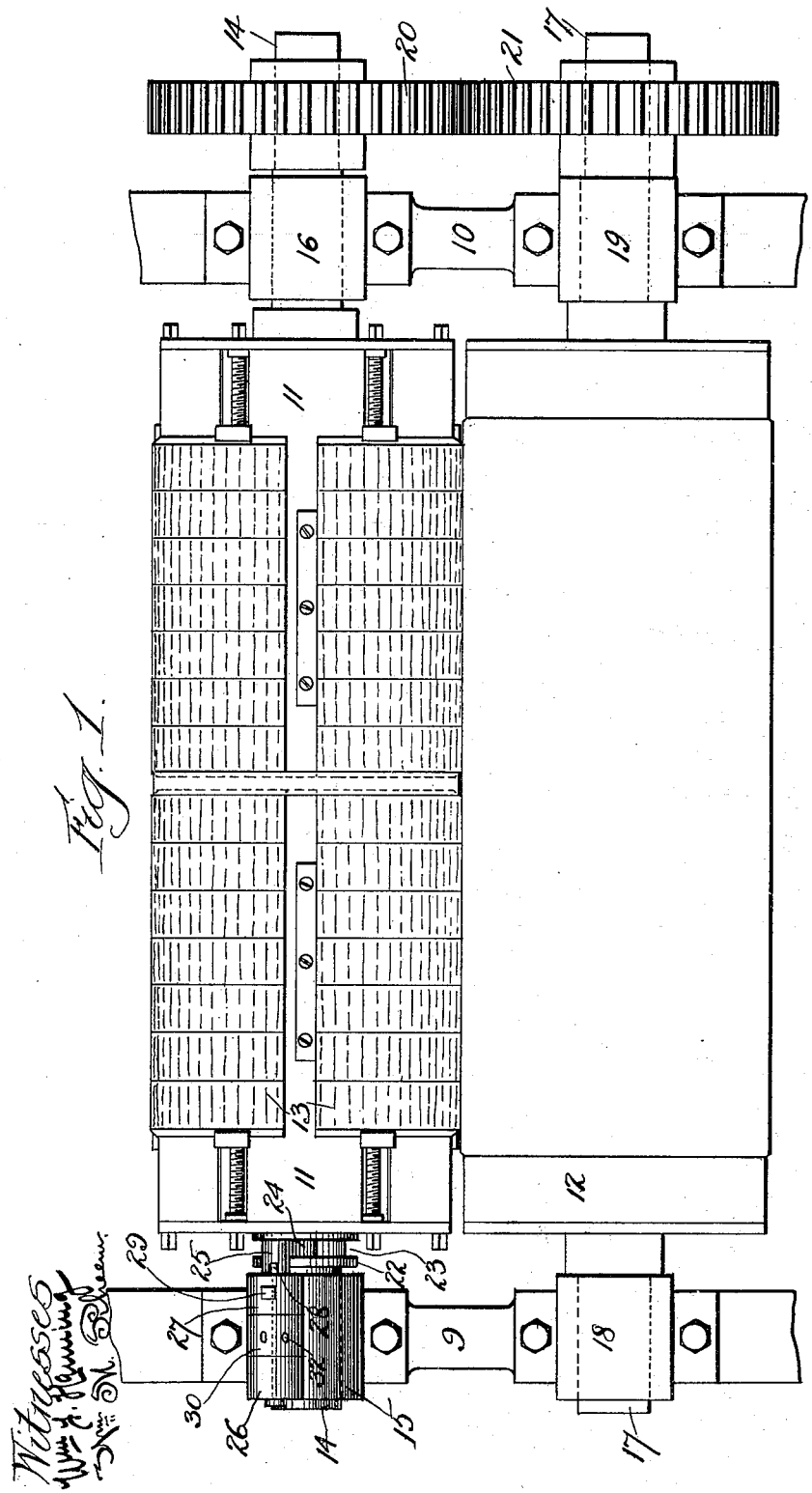

No. 637,777. Patented Nov. 28, 1899.
S. G. GOSS.
PRINTING PRESS.
(Application filed Nov. 29, 1897.)
(No Model.) 2 Sheets—Sheet 2.
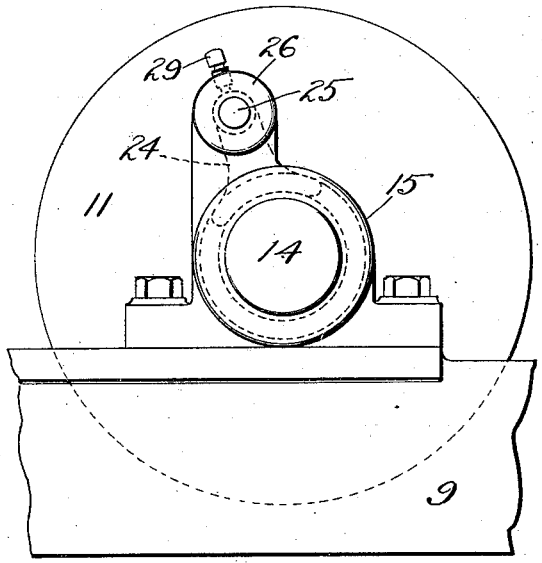
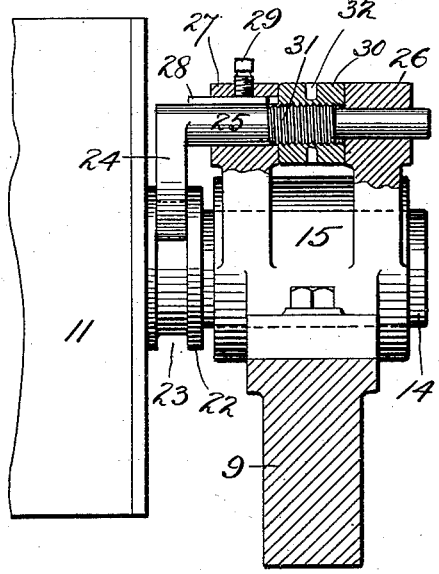
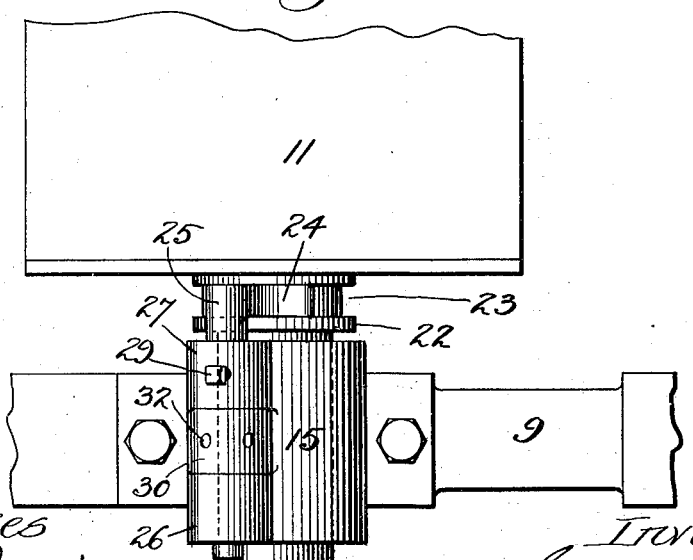
THE NORRIS PETERS CO., PHOTO-LITHO., WASHINGTON, D. C.

UNITED STATES PATENT OFFICE.

SAMUEL G. GOSS, OF CHICAGO, ILLINOIS, ASSIGNOR TO THE GOSS PRINTING PRESS COMPANY, OF SAME PLACE.

PRINTING-PRESS.

SPECIFICATION forming part of Letters Patent No. 637,777, dated November 28, 1899.

Application filed November 29, 1897. Serial No. 660,048. (No model.)

*To all whom it may concern:*

Be it known that I, SAMUEL G. GOSS, a citizen of the United States, residing in Chicago, in the county of Cook and State of Illinois, have invented certain new and useful Improvements in Printing-Presses, of which the following is a specification.

My invention relates to printing-presses, and particularly to perfecting-presses; and it consists in features of construction and combination of parts, as hereinafter described and claimed.

In the accompanying drawings, Figure 1 is a plan view. Fig. 2 is an end elevation of part of a press, illustrating my improvements. Fig. 3 is a plan view of the same. Fig. 4 is a partial vertical section of the form of invention shown in Figs. 2 and 3.

9 10 indicate the side frames of the press.

11 12 indicate the form and impression cylinders, respectively.

13 indicates stereotype-plates, which are secured upon the form-cylinder 11 in the usual manner.

14 indicates the shaft of the form-cylinder 11, said shaft extending through suitable bearings 15 16, arranged in the side frames 9 10, as shown in Fig. 1.

17 indicates the shaft of the impression-cylinder 12, said shaft being mounted in bearings 18 19, carried by the side frames 9 10.

20 21 indicate gears mounted upon the shafts 14 17, respectively, and meshing with each other in the usual way.

22 indicates a collar which is mounted upon the shaft 14 and is fixedly secured thereto near one end, preferably between the bearing 15 and the adjacent end of the cylinder 11, as shown in Fig. 1. The collar 22 is provided with an annular groove 23, as shown in Fig. 1.

24 indicates a fork which is adapted to fit into the groove 23 and is provided with a stem 25, arranged at right angles to the fork, as shown in Figs. 1 and 4. The stem 25 passes through suitable bosses 26 27, arranged at one side of the bearing 15, as shown in Fig. 4. The bosses 26 27 are spaced a distance apart, and a feather 28 is provided to prevent the rotation of said stem within the bosses 26 27. A set-screw 29 is also provided in one of the bosses to lock the stem 25 in position.

30 indicates a nut which is adapted to fit snugly between the bosses 26 27 and is screw-threaded to receive the central screw-threaded portion 31 of the stem 25, as shown in Fig. 4. The nut 30 is provided with a number of sockets 32 to receive a crowbar or other tool for rotating said nut to adjust the position of the stem 25 and fork 24. It will be evident that by adjusting the position of the stem 25 the form-cylinder 11 may be adjusted longitudinally as desired.

Wide enough gears 20 21 are used so that they are not carried out of mesh when the shaft 14 is moved lengthwise.

That which I claim as my invention, and desire to secure by Letters Patent, is—

1. In a printing-press, the combination with the frame of the press, of a cylinder, a shaft carrying said cylinder and journaled in the frame of the press, a stem 25, having a fork 24, a grooved collar 22 mounted upon said shaft, bosses 26 27 through which said stem passes, and a nut 30 upon said stem between said bosses, substantially as described.

2. In a printing-press, the combination with the frame of the press, of a cylinder, a shaft carrying said cylinder and journaled in the frame of the press, a stem 25, having a fork 24, a grooved collar 22 mounted upon said shaft, bosses 26 27 in which said stem is mounted, a nut 30 adjustably mounted upon said stem between said bosses, and means for preventing rotation of said stem, substantially as described.

SAMUEL G. GOSS.

Witnesses:
JOHN L. JACKSON,
HOLMES A. TILDEN.